United States Patent [19]

Hibbard

[11] Patent Number: 5,315,341
[45] Date of Patent: May 24, 1994

[54] METHOD AND APPARATUS FOR THROUGH-THE-LENS DISTANCE DETERMINATION

[75] Inventor: Robert H. Hibbard, Fairport, N.Y.

[73] Assignee: Eastman Kodak Company, Rochester, N.Y.

[21] Appl. No.: 809,999

[22] Filed: Dec. 18, 1991

[51] Int. Cl.⁵ .............................................. G03B 13/36
[52] U.S. Cl. .................................... 354/402; 354/409
[58] Field of Search ............... 354/400, 402, 406, 407, 354/408, 409, 195.1, 195.12, 195.13

[56] References Cited

U.S. PATENT DOCUMENTS

| | | | |
|---|---|---|---|
| 4,333,007 | 6/1982 | Langlais et al. | 354/402 |
| 4,614,418 | 9/1986 | Ishizaki et al. | 354/408 X |
| 4,716,429 | 12/1987 | Misawa | 354/409 |
| 4,748,509 | 5/1988 | Otake et al. | 354/400 X |
| 4,768,052 | 8/1988 | Hamada et al. | 354/402 |
| 4,816,663 | 3/1989 | Utagawa et al. | 354/402 |
| 4,816,859 | 3/1989 | Maruyama et al. | 354/400 |
| 4,829,331 | 5/1989 | Aibara | 354/400 |
| 4,885,600 | 12/1989 | Iwasa et al. | 354/400 |
| 4,933,700 | 6/1990 | Ikeda et al. | 354/400 |
| 4,951,075 | 8/1990 | Tukumaru et al. | 354/400 |

OTHER PUBLICATIONS

"Electronic Cameras Exposed," Electronics World, Mar. 1961.

Primary Examiner—W. B. Perkey
Attorney, Agent, or Firm—Thomas H. Close

[57] ABSTRACT

In an imaging system utilizing a through-the-lens phase-correlation type of autofocus system, architecture for determining absolute distance to one or more subjects to be imaged. In a preferred embodiment, the distance information is provided to means for effecting focal length adjustment so as to accomplish autocomposition of one or more of the subjects.

17 Claims, 7 Drawing Sheets

METHOD AND APPARATUS FOR THROUGH-THE-LENS DISTANCE DETERMINATION

CROSS REFERENCE TO RELATED APPLICATIONS

This application is related to co-pending, commonly-assigned applications entitled IMPROVED AUTOFOCUSING SYSTEM HAVING ANAMORPHIC OPTICS, and METHOD AND APPARATUS FOR SUBJECT FIELD DEPTH DETERMINATION IN AN AUTOFOCUSING IMAGING SYSTEM, filed on even date herewith in the name of R. H. Hibbard.

FIELD OF THE INVENTION

The present invention relates to distance measurement systems operable in optical and electro-optical image acquisition systems, such as photographic or video cameras, and in particular to distance measurement systems suitable for supporting ancillary image recording operations such as autocomposition.

BACKGROUND OF THE INVENTION

Autofocusing systems useable in an image acquisition system (hereinafter, an imaging system) can be categorized according to the arrangement of their optical assemblies. That is, a system is known according to whether it focuses through an image-taking optical system or through an independent optical system. Hence, one type of focus-detecting device is known in the art as a through-the-lens (TTL) phase-correlation autofocus (AF) system.

Figure 1:
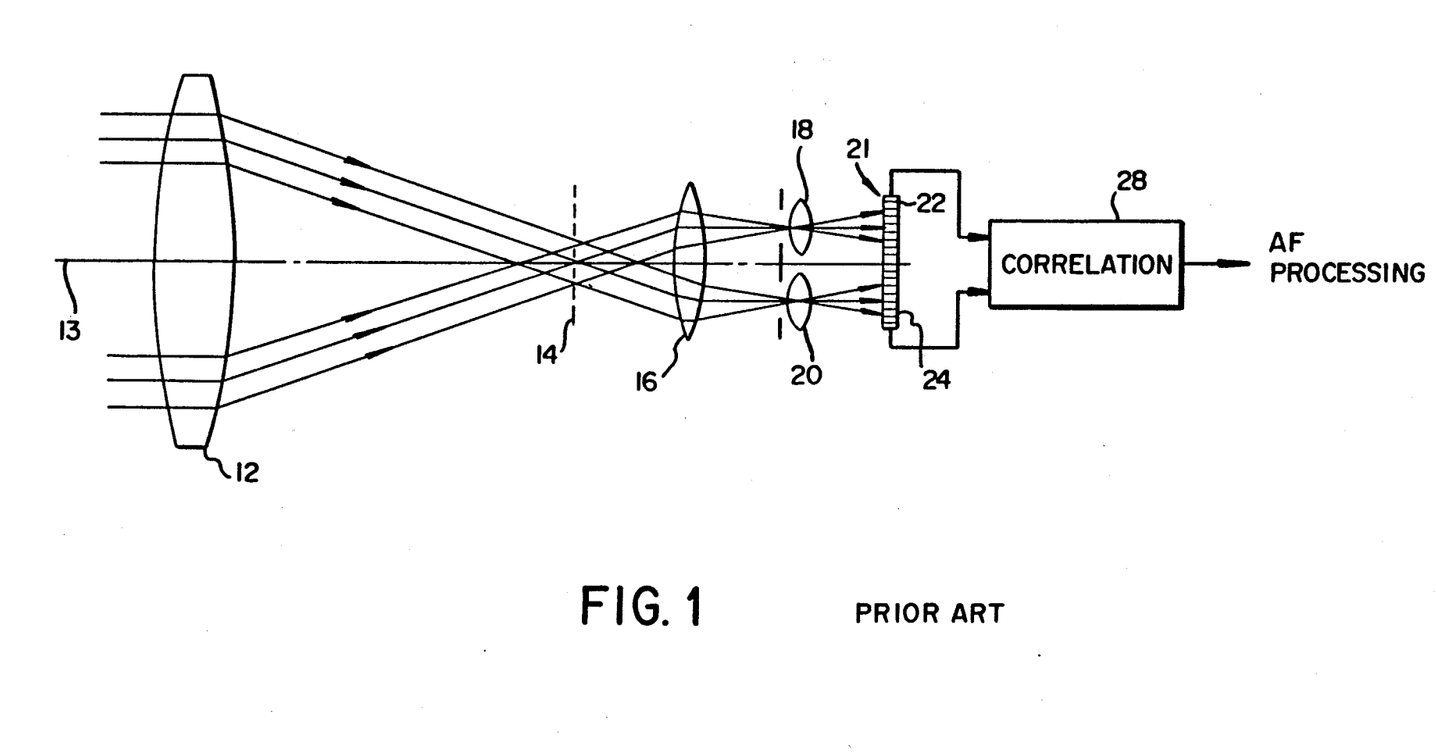
FIG. 1 shows an optical system of a phase-correlation focus detection device of the prior art.

One exemplary construction of the optical system used in a TTL autofocus system is shown in FIG. 1. First and second object images are passed through an objective lens 12 at respective first and second portions distant from the optical axis 13. At a position equivalent to a predetermined focal plane 14 of the objective lens 12, there is disposed an autofocus module which may include a condenser lens 16, a pair of image-forming lenses 18 and 20, and a linear array of photoelectric conversion devices, in the form of line sensor 21 having sections 22 and 24, disposed on the image-forming planes of image-forming lenses 18 and 20. Linear array sections 22 and 24 are respectively composed, for example, of first and second pluralities of photo diode cells $a_1-a_{10}$..., and $b_1-b_{16}$... The output of each cell in array section 22 is provided to a correlation system 28 to be sequentially converted to a digital signal $D(X)(X=1,2,3,4,5, ...)$. This image signal data $D(X)$ may then be provided to suitable means (not shown) for performing known AF calculations.

Figure 2:
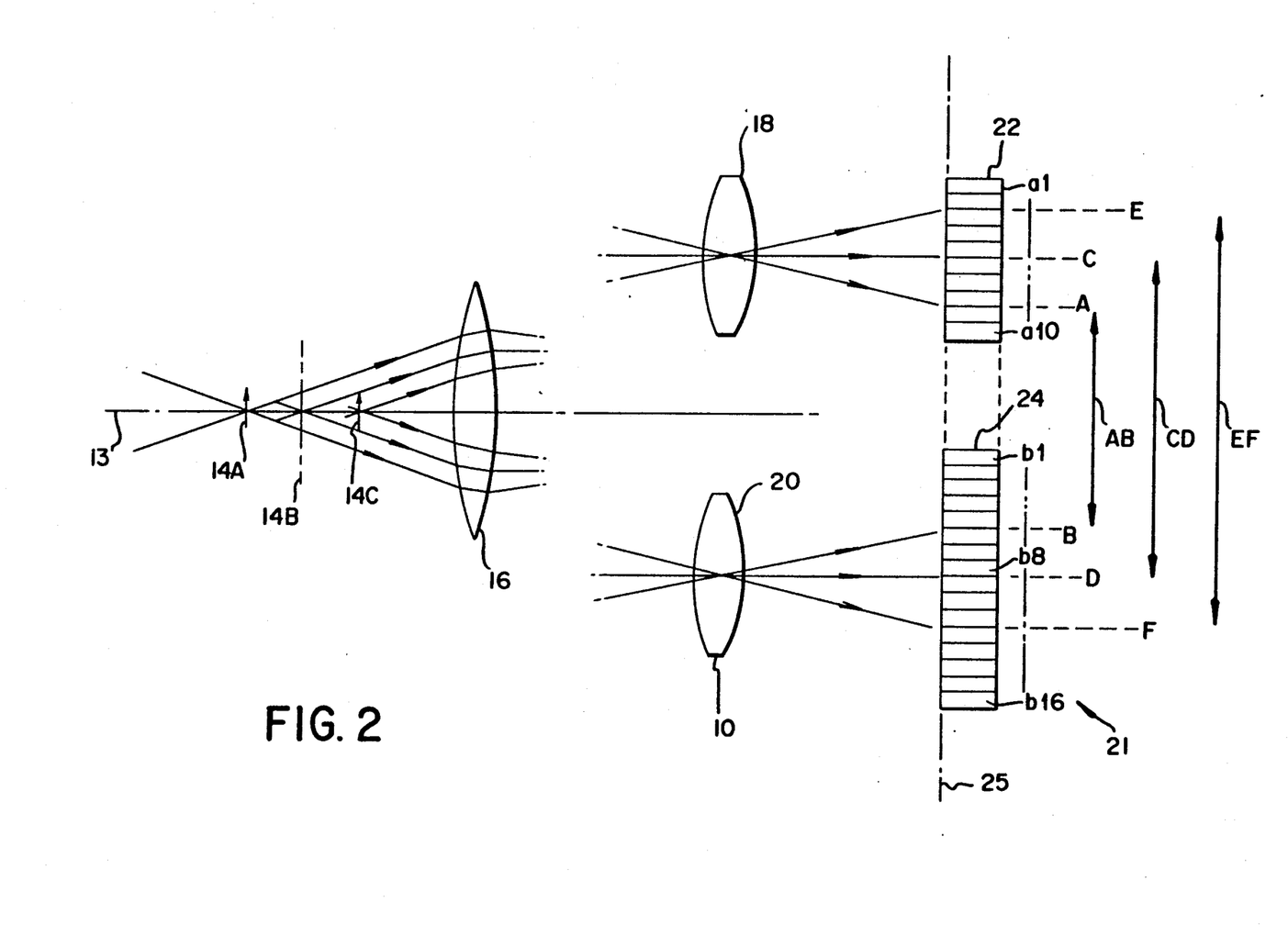
FIG. 2 shows a schematic diagram for explaining the operating principle of the device shown in FIG. 1(a).

As shown in FIG. 2, in a front-focus condition, an object image of the subject of the focus detection will be formed in a front-focus plane 14A in front of the predetermined focal plane 14B of the objective lens 12. Two separation images in such a front-focus condition are thereby formed by image-forming lenses 18 and 20 onto the sensor plane 25. Line sensor sections 12 and 14 thus register separation images at positions A, B that are respectively near the optical axis 13. In a rear-focus condition (wherein the object image is formed at plane 14C behind the predetermined focal plane 14B), the two separation images are formed at respective positions E, F at positions remote from the optical axis. In an in-focus condition (wherein the object image is formed on the predetermined focal plane 14B), the two separation images are formed at respective positions C, D on sensor plane 25. (The positions A, B, C, D, E, and F are merely illustrative of their relative locations on the sensor plane and are not meant to be limited to a certain cell.)

Accordingly, as the image patterns of the light distributions on line sensor sections 22 and 24 are converted into respective electrical signals, the relative focus condition can be discovered by AF computing means which process these electrical signals to detect the image position separations AB, CD, EF. Concurrently, the position of the objective lens 12 may be adjusted, until the desired in-focus condition (i.e., image separation CD) is detected.

Conventional through-the-lens correlation autofocus systems are therefore directed to detecting "defocus", which is an indication of the relative absence of focus with respect to a subject. The actual or "absolute" distance of one or more subjects from the autofocus system is not determined. Accordingly, this type of autofocus system has heretofore been unsuitable for supporting camera operations that require such a determination of the absolute distance(s) between the imaging system and the subject(s).

The conventional method for absolute distance determination is based on the triangulation of infared signals that are gathered passively or are produced by an emitter and reflected from the subject to be focussed. In conventional practice, the camera designer is therefore forced to substitute (or add) an active or passive infrared rangefinding autofocus system if the absolute camera-to-subject distance(s) are to be determined. Unfortunately, this sort of design compromise can be undesireable for several reasons, such as increases in camera cost, complexity, and weight.

Furthermore, most passive and all active infrared rangefinding systems cannot successfully measure very long camera-to-subject distances. If such systems are used, the hyperfocal distance of the camera lens must be limited to approximately twice the maximum range of the focussing system, and the focal length and aperture of the camera lens must be limited. In contrast, a through-the-lens correlation autofocus system has no limit on focussing range and therefore frees the designer from this hyperfocal distance requirement.

One very useful camera operation that requires information on absolute subject distance is known as autocomposition, wherein the focal-length of the taking lens (e.g., a zoom lens) is automatically adjusted so as to properly frame the subject(s) in an image frame. This operation typically requires that the subject(s) be determined according to their relative sizes with respect to a predefined categorization of sizes (e.g., landscape vs. portrait modes, etc.) Typically, absolute distance is measured by use of a rangefinding system and the subject category is predetermined by the camera design (e.g., by a camera having a fixed focal length lens), or is acquired upon operator input (e.g., by manipulation of switch means).

Accordingly, there is a need for a through-the-lens autofocus system that is capable of determining absolute distance measurements of the subject-to-camera distance(s), so that related operations such as autocomposition may be effected more simply and easily, and without resort to conventional distance-measuring systems.

SUMMARY OF THE INVENTION/PROBLEM SOLVED

According to the present invention, apparatus may be constructed for determining the absolute distance from an imaging system to a subject to be imaged. A first preferred embodiment includes an optical system including at least one optical element, means for positioning the optical element to achieve an in-focus condition with respect to the subject, means for providing data indicative of the optical element position associated with the in-focus condition, and means for determining, as a function of the optical element position data, the absolute distance to the subject.

In a second preferred embodiment, there is provided an apparatus for determining the absolute distance from an imaging system to a respective plurality of subjects to be imaged. The embodiment includes an optical system having at least one optical element, means for positioning the optical element to achieve an in-focus condition with respect to a principal one of the subjects, means for providing first data indicative of the particular optical element position associated with the in-focus condition, and means for providing second data indicative of the relative positions of the subjects with respect to the principal subject. Also provided is means for determining a first absolute distance to the principal subject, wherein the distance is determined as a function of the first data, and for determining a second absolute distance to at least one subject other than the principal subject, wherein the distance is computed as a function of the first and second data.

In another preferred embodiment, there is provided apparatus as described above and wherein the optical system includes means for adjusting the focal length of the optical system according to the absolute distance information to one or more of the subjects.

The present invention will become more apparent when taken in conjunction with the following description and drawings, wherein like characters indicate like parts and wherein the drawings form a part of the present description.

DESCRIPTION OF THE PREFERRED EMBODIMENTS

Figure 3:
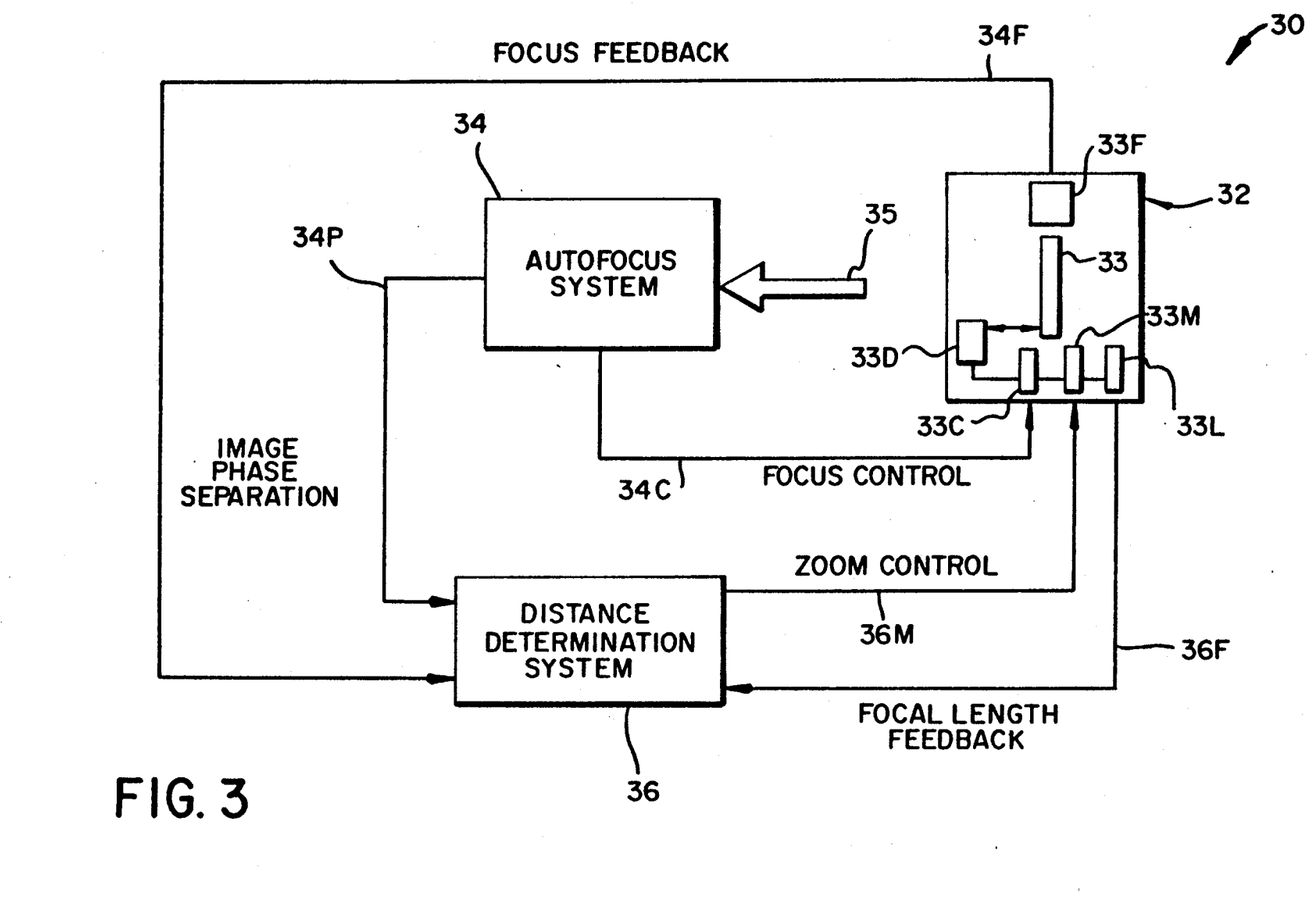
FIG. 3 is a block diagram illustrating a preferred embodiment of the present invention.

Referring now to FIGS. 3 through 5(b), the subject invention will be understood in detail. FIG. 3 shows a system block diagram of a through-the-lens distance determination apparatus 30 constructed according to the present invention. A preferred embodiment of the apparatus 30, when incorporated into an imaging system such as a camera, can provide the imaging system with absolute subject distance data for use in performing such ancillary imaging operations as autocomposition. Hence, in a particularly preferred embodiment, the apparatus 30 optionally includes an autocomposition system, as will be described shortly.

In FIG. 3, an optical assembly 32 shown in simplified form includes at least one moveable optical element 33, an optical element driving means 33D, and control means 33C, 33M for setting the focal position of the optical element and the focal length of the optical assembly. Integral to the assembly are sensors 33F, 33L which provide data on the position of the optical element and the focal length of the assembly 32. This data is provided to a phase correlation autofocus system 34 and a distance determination system 36.

Apart from the foregoing, the optical assembly 32 may include other elements or devices, and may be interconnected with other subsystems, as required by design objectives particular to the application and as known in the art.

Autofocus system 34 receives a light image 35 which is received by sense means and processing means so as to provide an optical element position control signal 34C and a phase separation information signal 34P. The control signal 34C is suitable for use by control and driving means in the optical assembly to effect a particular positioning of the optical element to achieve an in-focus condition.

Line 34F indicates schematically the provision of data indicative of the current positions of the focusing element(s) of the optical system 33 and line 36F thus indicates schematically the provision of data indicative of the current focal length of the optical system 33. Line 34C indicates schematically the provision of control signals for driving the optical element 33 to achieve an in-focus condition. Line 36M indicates schematically the provision of control signals for effecting an adjustment of the focal length of the optical assembly 32 (also termed a zoom condition). Line 34P indicates schematically the provision of data indicative of separation image information to suitable memory and processing circuitry in the distance determination system 36 for subsequent processing therein.

The distance determination system 36 is preferably implemented as, or includes, an integrated circuit computing means such as a microprocessor or embedded microcontroller. The microcontroller is contemplated as performing absolute distance determinations according to a first embodiment of the invention, and when suitably implemented, the microcontroller is also contemplated as being equipped to determine and output a focal length adjustment signal on line 36M to the image receiving assembly 32. The forgoing determinations are made according to algorithms, predefined functional relationships, and/or variables that are stored in a program memory, as described below.

Figure 4A:
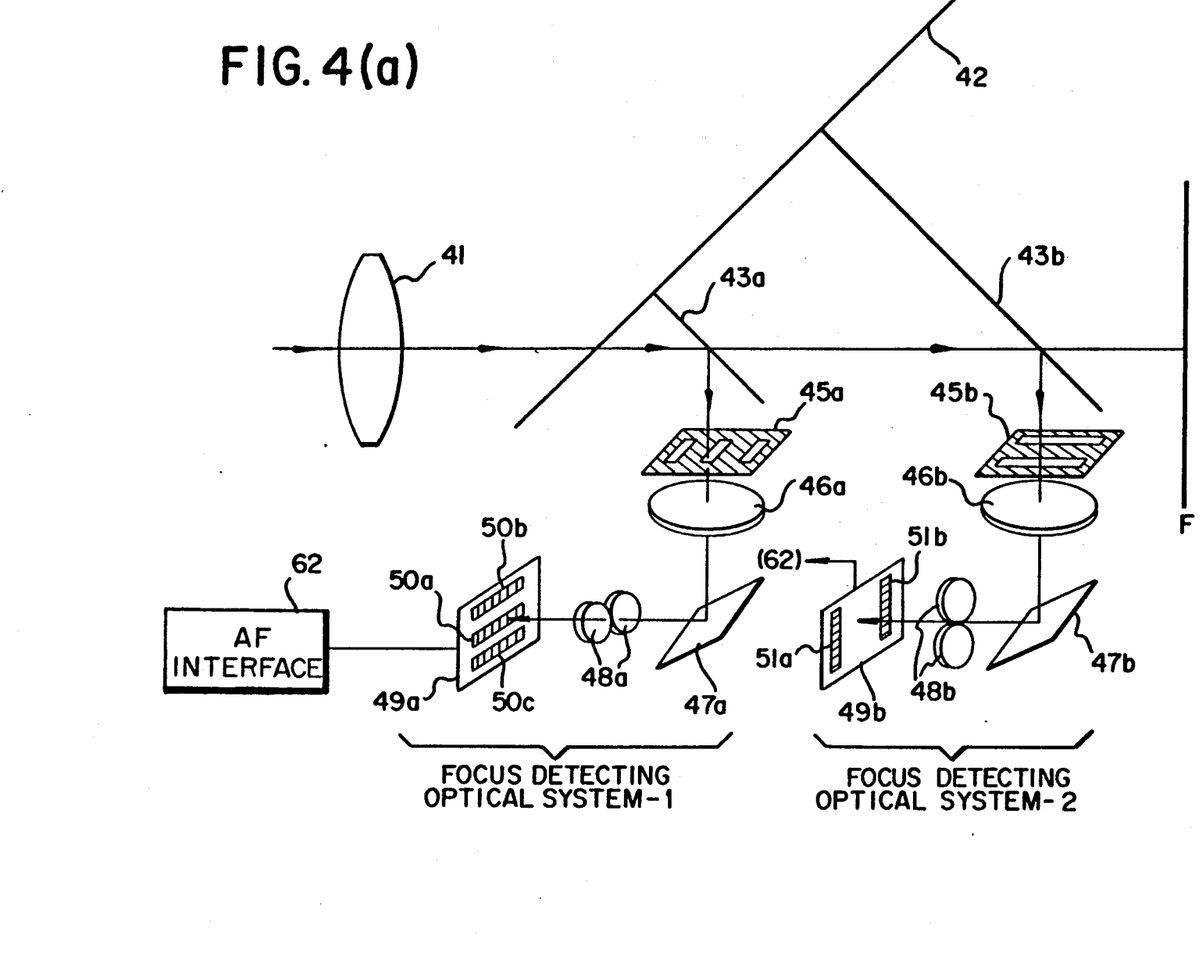
FIGS. 4(a) and 4(b) are simplified schematic diagrams of portions of the embodiment illustrated in FIG. 3.
Figure 4B:
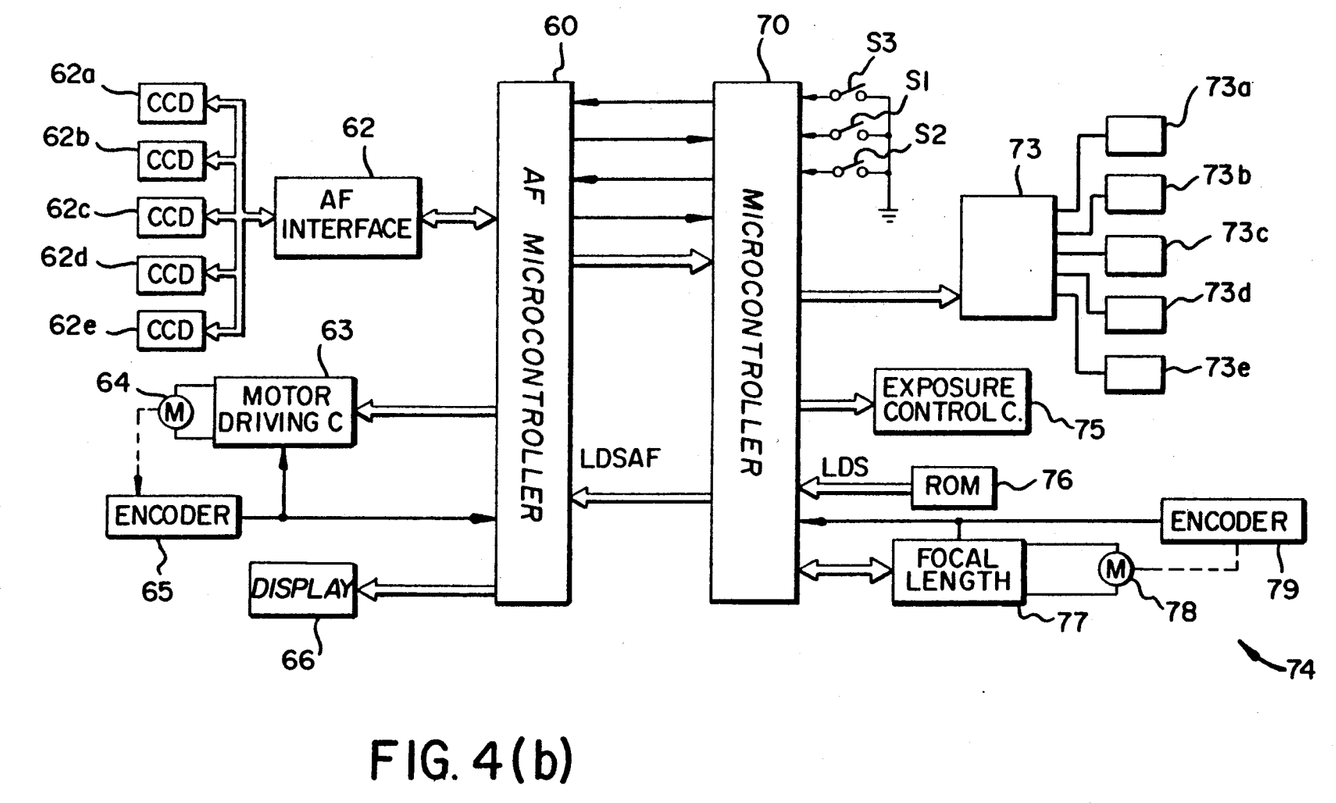

With reference now to FIGS. 4(a) and 4(b), the operation of the autofocus system 34 and the distance determination system 36 will be understood in greater detail.

FIG. 4(a) is a conceptual diagram showing the arrangement of first and second focus detecting optical systems suitable for use in the contemplated autofocus system 34 in an application of the present invention to to a single lens reflex photographic or still video camera. Such application should not be interpreted as limiting, however, as the present invention may be realized in an embodiment having a single-focus detecting system, and in embodiments suitable for application to other imaging systems such as a motion video camera.

In FIG. 4(a), numerals 41 and 42 denote a moveable focussing photographic lens and a main mirror, respectively; numerals 43a and 43b denote sub-mirrors provided behind the main mirror 42; numerals 45a and 45b denote field masks; numerals 46a and 46b denote condenser lenses; numerals 47a and 47b denote total reflection mirrors; numerals 48a and 48b denote respective pairs of re-imaging lenses; and numerals 49a and 49b denote image sensors 50a, 50b, 50c, and 51a, 51b each of which include plural linearly-arranged light receiving elements. The outputs of the image sensors are provided to an interface 62 in the autofocus system 34.

The elements 43a to 50c generally comprise a first focus detecting optical system, while the elements 43b to 51d similarly comprise a second focus detecting optical system. The reference mark F represents the imaging plane, such as may be occupied by an image capture medium, such as a photographic film, or an image acquisition means such as a high-resolution CCD array. The first and second focus detection systems preferably operate as phase correlation autofocus modules and may be arranged either at the front (as illustrated) or at the rear side of a predetermined focal plane F of the lens system 41.

FIG. 4(a) shows several contemplated arrangements of focus detection systems present in the autofocus system 34; each arrangement includes image sensors in positions that correspond to areas in an image field. The illustrated arrangement exemplifies positions of image sensors in the autofocus system 34 for effecting focus detection of subjects present in a plurality of areas. Each of the image sensors thereby detects the luminance distribution of a respectively-divided area of the image field. However, the number and arrangement of such image sensors may differ than those illustrated, depending upon the application.

Light from a subject incident through the photographic lens 41 passes through the main mirror 42 and is reflected and divided by the sub-mirrors 43a and 43b and conducted to the first and second focus detecting optical systems provided in the lower portion of the camera. The divided incident light beams pass through the field masks 45a, 45b, condenser lenses 46a, 46b and re-imaging lenses 48a and 48b disposed in the vicinity of a plane equivalent to the film surface F so as to form pairs of separation images on the image sensors 49a and 49b. In a first preferred embodiment, the exit pupil of the photographic lens is directed to an embodiment of image sensor 49a which includes a single central area 50a with respect to X axis, and in other embodiments the image sensor 49a may be constructed to include plural focus detecting areas 50a, 50b, and 50c. In still another embodiment, the exit pupil is additionally divided into two areas with respect to Y axis perpendicular to the X axis, and directed to image sensor 49b, such that the areas correspond to the focus detecting areas 51a and 51b.

The spacing between the two separation images varies depending on whether the photographic lens is in in-focus condition or out-of-focus condition, and from the image spacing it is possible to determine a defocus amount of the photographic lens, as known in the art. However, in a departure from the prior art, the image spacing has been found useable in determining the absolute distances to subjects imaged by the optical assembly 32, as will now be described.

As shown in FIG. 4(b), a preferred embodiment of the present invention may be constructed wherein numerals 60 and 70 denote an AF microcontroller and a distance determination microcontroller, respectively; numerals 62a to 62e denote light sensing elements comprising photodiodes disposed in correspondence to predetermined focus detecting areas; numerals 73, 74, and 75 denote a multiplexer, a focal length (zoom) encoding and control means, and an exposure control circuit, respectively; numeral 76 denotes a program storage means such as read only memory (ROM). The storage means contains various lens data and functional relationships necessary for automatic focusing control, distance determination, and autocomposition.

It should be noted that in accordance with the invention, upon a control provided from the distance determination microcontroller 70, the lens data signals LDS and LDSAF convey particular functional relationships in the form of (for example) preprogrammed algorithms and transformation coefficients, for: a) transforming the defocus amounts calculated as a result of focus detection into lens shifting values for focussing the optical assembly 32; b) transforming lens position data into distance determination data, whereby the absolute distance to each of one or more subjects is determined; and c) setting the focal length of the optical assembly 32. Additionally, switches $S_1$, $S_2$, and $S_3$ may be closed to manually input a selected subject category mode, as will be explained shortly.

Numeral 62 denotes an AF interface for driving the CCDs and transferring the outputs thereof to the AF microcontroller 60; numerals 63 and 77 denote motor driving circuits; numerals 64 and 78 denote motors for moving the lens 41 to the in-focus position and for adjusting focal length; numerals 65 and 79 denote encoders for detecting the position of lens 41, and for detecting the focal length of the optical assembly 32, respectively; and numerals 66 and 80 denote display sections for display of various camera operation information concerning, for example: whether the photographic lens is in-focus or out-of-focus, what is the distance calculated to subject(s), what subject category has been inputted or calculated for autocomposition mode, etc.

The AF microcomputer 60 drives CCDs 61a to 61e through the AF interface 22, receives the outputs of the CCDs after analog-to-digital conversion, and performs AF calculations on the basis of the received data to calculate a defocus amount. Based on the lens shifting functions represented in the autofocus data LDSAF generated by the microcontroller 70, the AF microcomputer 60 calculates an amount of lens shifting from the defocus amount. A drive signal is provided to the motor driving circuit 63 to drive the motor 64, causing the lens to shift towards the in-focus position while the lens position is continuously detected by the encoder 65, to establish a predetermined amount of lens shifting. The detected motion of the lens shift is compared with the amount of lens shifting calculated by the AF controlling microcomputer 20; upon confirming in-focus state, as evidenced by calculations made on the separation image information, the lens element shift is complete. An in-focus state signal can also, for example, be provided to the display section 66.

If it is determined that the defocus amount is outside the range which permits detection of an in-focus state, when the distance between the photographic lens position and the nearest subject is very large, for example, the correlation calculation is repeated during one reciprocation of the lens position from the nearest photographic position up to infinity. Lens scanning is executed to search the lens position that permits detection of the in-focus state.

For deciding the priority of focusing, the AF microcontroller 60 performs data processing and precorrelation calculations with respect to each focus detecting area to select a subject hereinafter termed the principal subject. Such subject selection can be made according to the proximity of the subject to the sensor array, but other criteria may be implemented according to the application.

The autofocus operation can include repetitive checks to determine whether the defocus amount calculated previously with respect to the principal subject is within a preset in-focus range or not. If the answer is affirmative, a signal is output to the microcontroller 70, urging the latter to begin absolute distance determinations. If the defocus amount is found to be outside the in-focus range, the AF program advances to a mode wherein a number of lens driving pulses is determined from both the defocus amount calculated previously and a lens shifting transformation coefficient from the input lens data LDS. Then, this number of pulses is sent to the lens driving means until the AF microcontroller 60 determines that the image receiving assembly 32 is in in-focus condition with respect to the principal subject.

When the AF microcontroller 60 activates the signal to indicate to the microcontroller 70 to effect a distance determination, a sequence of calculations are performed, as will now be described with reference to the flow charts of FIGS. 5(a) and 5(b).

Figure 5A:
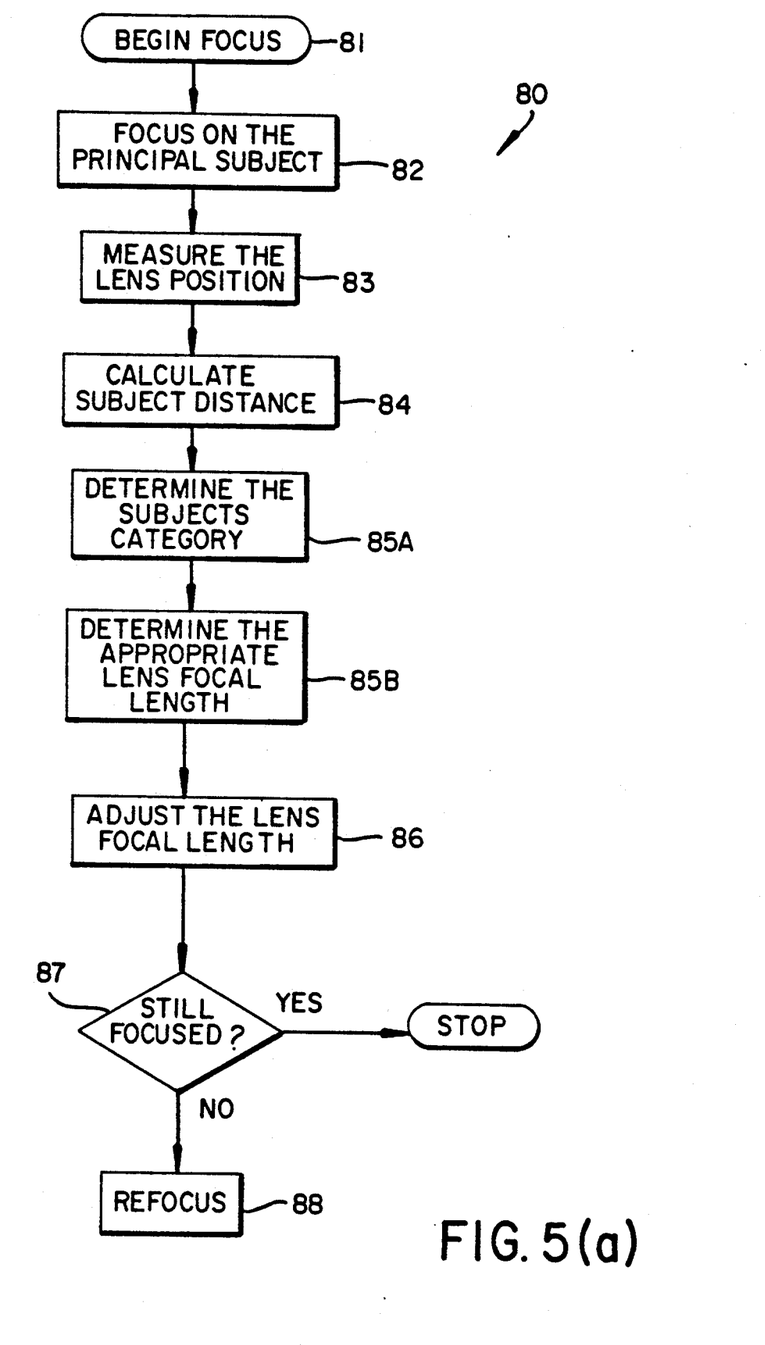
FIGS. 5(a) and 5(b) respectively are flow charts illustrating respectively a preferred and an alternative method of operation of the embodiment of FIG. 3.
Figure 5B:
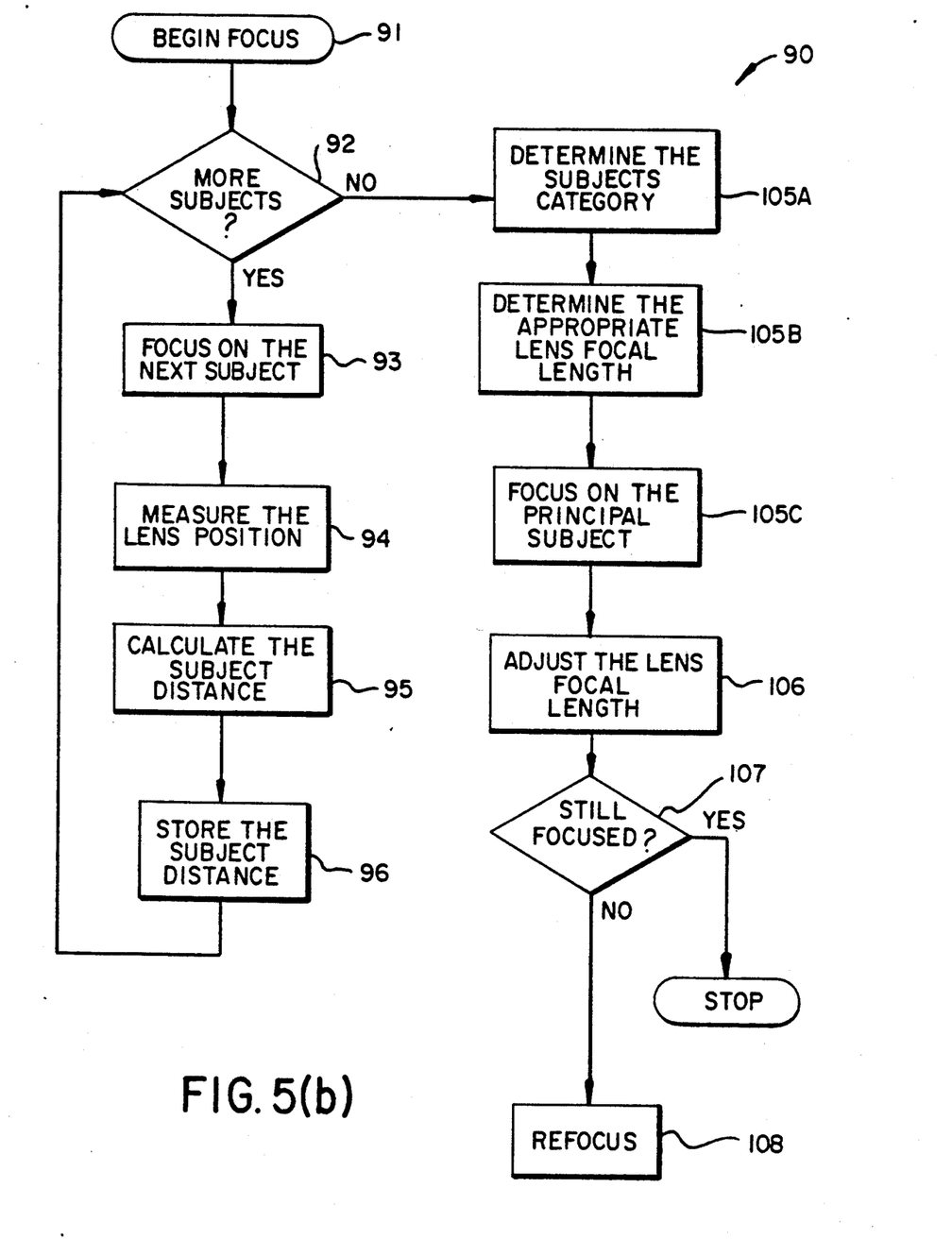

FIGS. 5(a) and 5(b) respectively illustrate first and second preferred methods for determining the absolute distances of one or more subjects to be recorded in an image frame. For the purpose of simplifying the following description, three subjects will be assumed to be imaged. Also illustrated are steps for performing autocomposition of the subject(s) to be captured or recorded.

With reference now to FIG. 5(a), a first preferred method 80 of calculating absolute distances will be understood. As was illustrated in FIG. 2, each subject will be imaged as two separation images focused on a given light-sensing array at one of three possible types of locations. A far-field subject is imaged at positions A and B on a given sensor array; an in-focus subject is imaged at positions C and D; and a near-field subject is imaged at positions E and F. Each interval AB, CD, and EF indicates the separation interval between each of the corresponding positions A and B; C and D; and E and F. According to the present invention, the separation interval CD can be expected to conform to a specific length that is predetermined by the construction of the optical system. That is, in the calculations to follow, positions C and D, and interval CD, are values established when the autofocus system 30 is manufactured. Positions A, B, E, and F (and hence intervals AB and EF) are variables that depend upon the distances from the optical system to the respective subjects.

The first step 81 (to focus on a selected (principal) subject in accordance with the above autofocusing procedure) has been described. Upon the determination 82 that the principal subject has been brought into focus, steps 83 and 84 are directed to computing the absolute distance from the imaging system (e.g., camera) to the principal subject. If it is determined that subjects other than the principal subject (i.e., secondary subjects) are present, the computation of their absolute distances will follow the computation of the principal subject distance.

In step 83, positional data feedback of the position(s) of the lens 41 in the optical system 33 is used in the determination of the absolute distance of the principal subject from the image receiving system 32. That is, the absolute distance to the (now in-focus) principal subject is computed by the microcontroller 70 according to the position of the lens, and according to focal distance functional relationships that are particular to the optical assembly 32. Such relationships may be derived by those skilled in the lens design arts, and pre-programmed in the program storage means (ROM 76), during the design or manufacturing phases of the optical assembly.

With the absolute distance to the principal subject known, and given the focal length data provided from encoder 79, the absolute distances from the camera to each of the other subjects (i.e, the second, third, ... nth subject) are determined from the respective positions and magnitudes of the separation intervals AB, EF, etc. These subject distances are determined according to the formula:

$$n_{th} \text{ subject distance} = \frac{FL^2 (FD)}{FL^2 + F\#(FD)(IO) - F\#(FL)(IO)}$$

where:
$n_{th}$ subject distance = distance to be determined, from the optical system 33 to the $n_{th}$ of the secondary subjects;

focal distance (FD) = distance from the optical system 33 to the first image offset (IO) = the difference between the separation of the images of the $n_{th}$ subject, and the separation of the images of the principal (in-focus) subject, e.g., for a far-field subject:

image offset = CD − AB;

focal length (FL) = the focal length of the optical system 33 at the moment of achieving in-focus condition for the principal subject; and f-number (F#) = the f-number of the optical system 33; may be calculated from the focal length (FL) when the largest aperture is used for focusing. As through-the-lens phase correlation systems typically focus at maximum aperture, the f-number is a given amount.

With the principal subject distance known, and the remaining secondary subject distances also known, it is then possible to pursue ancillary camera operations that require such distance information.

Accordingly, the absolute distance information may be output from the microcontroller 70 to an interface 73 for use by, for example: flash illumination control means 73a, lens aperture control means 73b, outboard data recording means 73c, programmed shutter control means 73d, audible warning signal generator means 73e, or other apparatus not shown. The information may be also used internally; for instance, in effecting improved exposure control in the exposure control circuit 75. An exposure calculation may be made on the basis of various input data received from known means (not shown) so that an exposure control signal may be output to the exposure control circuit 75 to effect an appropriate exposure. As another example, the microcontroller 70 can output exposure information that is based on the absolute distance information to the display section 80, so as to aid the operator of the camera.

In a particularly preferred embodiment of the present invention, the distance information generated by the distance determination microcontroller 70 is used by autocomposition circuitry optionally implemented in the microcontroller 70 for setting (in steps 85A-85C) the focal length of the optical system 33 so as to compose single or multiple subjects in an image frame.

First, in step 85A, the microcontroller 70 determines the category of subject(s) being imaged: that is, whether the content of the image field should be interpreted as a small-scale image, such as a portrait; a medium-scale image, such as a group; or a large-scale image, such as a landscape. Such information may be ascertained from a manual input device such as the subject mode selection switches $S_1$, $S_2$, $S_3$. Alternatively, this determination may be automatically computed by the microcontroller 70 according to the number of subject image pairs indicated in the phase separation information, and the relative disparity of their absolute distances from the optical system 33.

Next, in step 85B, the optimum focal length of the optical assembly 32 may be computed by performing autocomposition calculations that are based on the subject category and the absolute subject distances, according to known algorithms and settings that are preprogrammed and resident in ROM 76. In step 86, the optical assembly 32 is adjusted to the appropriate focal length. If the optical assembly 32 includes a zoom lens of the varifocal type, it may be necessary to adjust the focus of such a lens after the appropriate focal length is set. The in-focus condition is checked as indicated in step 87, and refocusing (step 88) may be performed if necessary.

An alternate method for determining principal and secondary absolute subject distances is shown in FIG. 5(b). In steps 91-96, the optical system is autofocused on each subject in turn, whereby the respective camera-to-subject distances are calculated and stored when each subject is brought into focus. In steps 105-108, the autocomposition is performed as already described with respect to steps 85-88 in FIG. 5(a). This method does not require the calculation of the multiple subject distances using the equation listed above.

Those skilled in the art will realize that the foregoing methods and apparatus will have useful application to one or more ancillary operations other than autocomposition, as may be determined by the application or a design choice. For example, the microcontroller 70 may be implemented to perform other useful operations that may be improved upon the provision of absolute distance information. Further, it will be recognized that the invention may be implemented in single-subject focusing cameras as well as in multi-subject focusing cameras. For example, a single-subject (also known as a single-spot) focusing camera need use only the absolute subject distance and the subject category to determine the correct focal length of the zoom lens. Information on the focal length of the lens is not necessary since estimation of the secondary, tertiary, etc. subject distances is not required.

While there has been shown what are considered to be the preferred embodiments of the invention, it will be manifest that changes and modifications may be made without departing from the essential spirit of the invention. It is intended, therefore, in the annexed claims, to cover all such changes and modifications as may fall within the scope of the invention.

I claim:

1. Distance determination apparatus for determining the absolute distances of a plurality of subjects from the apparatus, said plurality including principal and secondary subjects, comprising:

an optical assembly focusable according to the position of at least one positionable optical lens element therein;

autofocusing means for:
   a) positioning the lens element to achieve an in-focus condition with respect to the principal subject, and
   b) sensing the separation of a secondary subject relative to the principal subject, and for providing data indicative of the separation distance;

means for sensing the optical element position at the in-focus condition and for providing position data indicative of said position;

means for providing a predetermined function that relates the optical element position data to the absolute distance of the principal subject; and computing means for:
   a) computing the absolute distance of the principal subject according to the predetermined function and the lens element position data, and for providing corresponding principal subject distance data, and
   b) determining the absolute distance to the secondary subject according to the separation distance data and the principal subject distance data, and for providing corresponding secondary subject distance data.

2. The apparatus of claim 1, wherein the optical element comprises a focussing lens.

3. The apparatus of claim 2, wherein the autofocus means comprises:

first means for determining the focus condition of the optical assembly;

second means, responsive to a determination of an out-of-focus condition, for determining an adjustment of the optical element position sufficient to place the optical assembly in an in-focus condition; and lens element driving means, responsive to the control means, for effecting the predetermined adjustment of the focussing lens position.

4. The apparatus of claim 3, wherein the first means comprises a phase-correlation autofocus module.

5. The apparatus of claim 3, wherein the second means comprises an autofocus microcontroller.

6. The apparatus of claim 3, wherein the position sensing means comprises a linear encoder operatively connected to the focussing lens.

7. The apparatus of claim 3, wherein the function provision means comprises a program storage means capable of storage therein one or more algorithms for defining the predetermined function.

8. The apparatus of claim 7, wherein the storage means comprises a read-only memory (ROM) device.

9. The apparatus of claim 3, wherein the computing means comprises a digital microcontroller.

10. An imaging system having a through-the-lens distance determination feature for determining the absolute distance from the system to a plurality of subjects, the plurality including principal and secondary subjects, and an autocomposition feature for composing one or more of the subjects in an image frame, comprising:

an optical assembly focusable according to the position of at least one positionable focussing lens therein;

phase correlation autofocusing means for positioning the focussing lens to achieve an in-focus condition with respect to the principal subject, including:
a) first means for determining the focus condition of the assembly,
b) second means, responsive to a determination of an out-of-focus condition, for determining an adjustment of the lens element position sufficient to drive the optical assembly towards an in-focus condition,
c) lens element driving means, responsive to the control means, for effecting the predetermined adjustment of the lens element position, and
d) means for determining the separation distance of the secondary subject relative to the principal subject, and for providing data indicative of the separation distance;

means for sensing the lens element position at the in-focus condition and for providing data indicative of said position;

means for providing a predetermined function relating the lens element position data to the absolute distance of the principal subject;

focal length sensing means for sensing the focal length of the optical assembly, and for providing corresponding focal length data;

computing means for:
a) computing the absolute distance of the principal subject according to the predetermined function and the lens element position data, and for providing corresponding principal subject distance data; and
b) determining the absolute distance to the secondary subject according to the separation distance data and the principal subject distance data, and for providing corresponding secondary subject distance data;

autocomposition means, responsive to the absolute distance data and the focal length data, for determining a focal length adjustment such that the principal and secondary subjects are composed in an image frame and for providing a corresponding focal length adjustment signal; and means, responsive to the autocomposition means, for adjusting the focal length of the optical assembly according to the a focal length adjustment signal.

11. The apparatus of claim 10, wherein the function provision means comprises a program storage means capable of storage therein one or more algorithms for defining the predetermined function.

12. The apparatus of claim 10, wherein the computing means comprises a distance determination microcontroller.

13. The apparatus of claim 12, wherein the autocomposition means is integral with the microcontroller.

14. A method of through-the-lens distance determination for determining the absolute distances of a plurality of subjects from an optical assembly, said plurality including principal and secondary subjects, and the optical assembly being focusable according to the position of at least one positionable optical element therein, comprising the steps of:

positioning the optical element to achieve an in-focus condition with respect to the principal subject;

sensing the optical element position at the in-focus condition and providing data indicative of said position;

providing a predetermined function that relates the lens element position data to the absolute distance of the principal subject;

computing the absolute distance of the principal subject according to the predetermined function and the lens element position data;

providing corresponding principal subject distance data;

determining the separation of a secondary subject relative to the principal subject and providing data indicative of the separation distance;

determining the absolute distance to the secondary subject according to the separation distance data and the principal subject distance data; and providing corresponding secondary subject distance data.

15. A method of autocomposition using through-the-lens distance determination for determining the absolute distance from an optical assembly to a plurality of subjects, the optical assembly being focusable according to the position of at least one positionable optical element therein and the plurality including principal and secondary subjects, comprising the steps of:

positioning the optical element to achieve an in focus condition with respect to the principal subject;

computing the absolute distance of the principal subject according to the predetermined function and the lens element position data, and providing corresponding principal subject distance data;

determining the separation distance of a secondary subject relative to the principal subject, and providing data indicative of the separation distance;

computing the absolute distance to a secondary subject according to the separation distance data and the principal subject distance data, and providing corresponding secondary subject distance data;

sensing the focal length of the optical assembly and providing corresponding focal length data;

in accordance with the principal subject distance data, secondary subject distance data, and the focal length data, determining a focal length adjustment such that the principal and secondary subjects are composed in an image frame, and providing a corresponding focal length adjustment signal; and adjusting the focal length of the optical lens system according to the focal length adjustment signal.

16. The method of claim 15, wherein the separation distance determination step includes a phase correlation autofocusing step, whereby separation images of the principal and secondary subjects are detected.

17. The method of claim 16, wherein the step of computing a secondary subject distance is performed at least in part according to the formula:

$$\text{secondary subject distance} = \frac{FL^2 (FD)}{FL^2 + F\#(FD)(IO) - F\#(FL)(IO)}$$

where:
focal distance (FD) = distance to the principal subject;
image offset (IO) = the difference between the separation of the images of the secondary subject and the separation of the images of the principal subject;
focal length (FL) = the focal length of the optical system at the in-focus condition; and
f-number (F#) = the f-number of the optical system.

* * * * *